United States Patent [19]

Ströder et al.

[11] Patent Number: 5,308,585
[45] Date of Patent: May 3, 1994

[54] PROCESS AND APPARATUS FOR COOLING HOT SOLIDS COMING FROM A FLUIDIZED BED REACTOR

[75] Inventors: Michael Ströder, Neu-Anspach; Johannes Albrecht, Wöllstadt; Martin Hirsch, Friedrichsdorf; Rainer Reimert, Idstein; Wladyslaw Lewandowski, Schwalbach; Rudolf Kral, Neu-Anspach, all of Fed. Rep. of Germany

[73] Assignee: Metallgesellschaft Aktiengesellschaft, Frankfurt am Main, Fed. Rep. of Germany

[21] Appl. No.: 997,089

[22] Filed: Dec. 29, 1992

[30] Foreign Application Priority Data

Jan. 8, 1992 [DE] Fed. Rep. of Germany ....... 4200244

[51] Int. Cl.$^5$ ................ F27B 15/16; B01J 8/28
[52] U.S. Cl. ................ 422/142; 34/579; 34/590; 122/4 D; 165/104.16; 422/146
[58] Field of Search ........... 422/141, 142, 146, 147; 110/245; 34/57 A; 122/4 D; 431/7, 170; 432/58; 165/104.16

[56] References Cited

U.S. PATENT DOCUMENTS

| 4,010,002 | 3/1977 | Degel et al. .......... 422/145 X |
| 4,240,927 | 12/1980 | Karweil et al. ........ 422/145 X |
| 4,405,339 | 9/1983 | Kunii ................. 422/145 X |
| 4,475,884 | 10/1984 | Shang et al. .......... 422/145 X |
| 5,141,708 | 8/1992 | Campbell, Jr. et al. ..... 422/142 |

FOREIGN PATENT DOCUMENTS

| 0407730 | 1/1991 | European Pat. Off. . |
| 3741935 | 6/1988 | Fed. Rep. of Germany . |
| WP90/05020 | 5/1990 | PCT Int'l Appl. . |
| 2148734 | 6/1985 | United Kingdom . |

OTHER PUBLICATIONS

Alsthom Review, pp. 31 to 42, Circulating Fluidized Bed Coal-Fired Boilers, J. P. Tessier, and P. Maynadier.

Mathematische Modellierung zirkulierender Wirbelschichten für die Kohleverbrennung, pp. 57 to 67.

Primary Examiner—Robert J. Warden
Assistant Examiner—Amalia L. Santiago
Attorney, Agent, or Firm—Herbert Dubno

[57] ABSTRACT

Hot solids coming from a fluidized bed reactor are passed through the cooling apparatus and at least in part are recycled to the fluidized bed reactor. In the cooling apparatus the hot solids flow first through a first fluidized bed and then flow downwardly through a gas-collecting space to a second fluidized bed, which is provided with cooling coils and in which the solids flow downwardly to a solids transfer passage and are then raised through a third fluidized bed to a discharge line. The system is controlled to cause solids coming from the first fluidized bed to flow through the gas-collecting space directly to the discharge line.

9 Claims, 2 Drawing Sheets

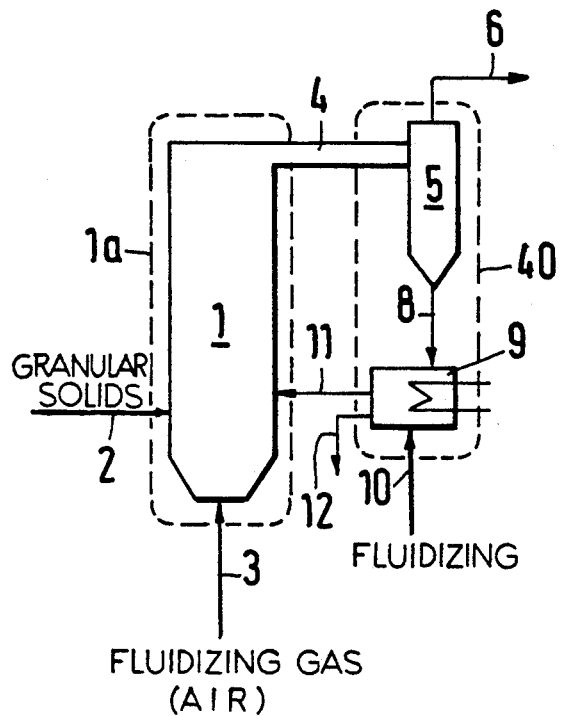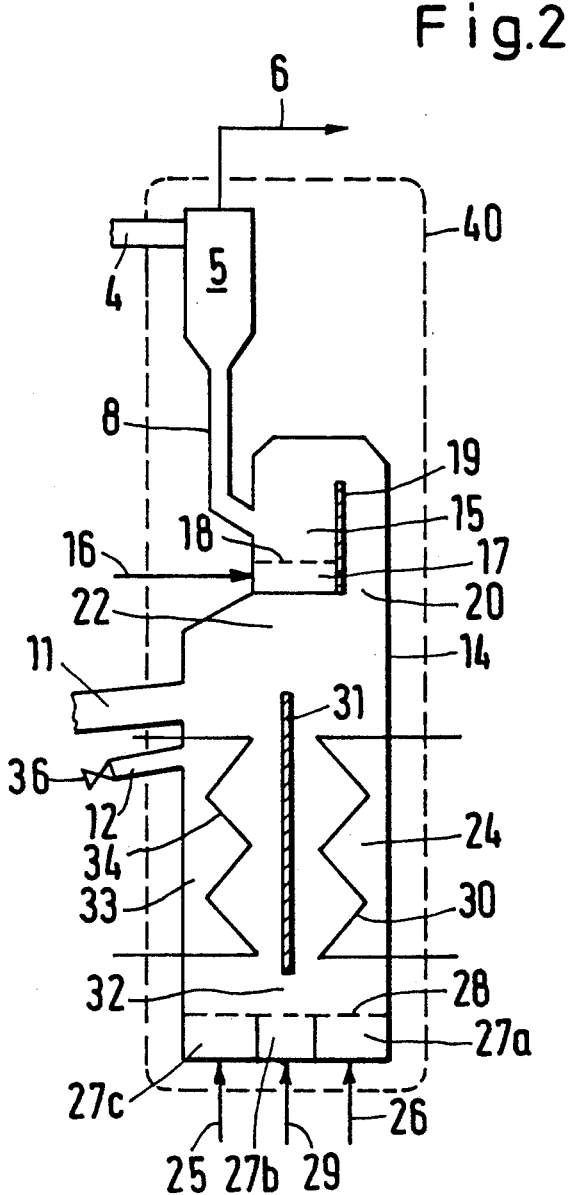

PROCESS AND APPARATUS FOR COOLING HOT SOLIDS COMING FROM A FLUIDIZED BED REACTOR

FIELD OF THE INVENTION

Our present invention relates to the cooling of hot solids from a fluidized bed reactor and, more particularly, to a method of and an apparatus for cooling hot solids in a fluidization system. More particularly, this invention relates to a process of cooling hot solids, which come from a fluidized bed reactor and are conveyed by hot gas from the reactor to a separator, separated from the gas in the separator and then supplied to a cooling zone, which contains at least one fluidized bed provided with cooling means, wherein at least part of the solids is recycled from the cooling zone in a discharge line to the fluidized bed reactor, and relates also to a cooling apparatus for carrying out that process.

BACKGROUND OF THE INVENTION

The cooling of hot solids downstream from a separator at the discharge end of, for example, an appended-bed reactor or, in general, a fluidized bed reactor, utilizing a fluidizing principle is known In general, processes and apparatus whereby at least part of the solids cooled are recycled to the fluidized bed reactor are known from DE-A-37 41 935, EP-A-0 407 730, and GB-A-2,148,734. By and large the earlier systems are not as versatile, efficient and controllable as may be required or desired.

OBJECTS OF THE INVENTION

It is an object of the invention to improve the know processes and apparatuses, to use simple apparatuses, to ensure that the solids stream can effectively be controlled and will intensely be cooled, and to provide an arrangement which also can be operated under superatmospheric pressure.

Still another object of this invention is to provide a cooling process for the hot solids from a fluidized bed reactor which will be free from drawbacks of the prior art.

A further object of the invention is to provide a method and an apparatus which has increased versatility and efficiency with respect to the cooling of solids from a fluidized bed reactor. In accordance with the invention the solids are passed from the separator to a first fluidized bed, the solids are controlled by control means to selectively pass from the first fluidized bed to an underlying second fluidized bed or to the discharge line, the solids are caused to move downwardly in the second fluidized bed pass through a transitional region into the lower end of a third fluidized bed, the solids are raised in the third fluidized bed and at least part of the solids are withdrawn through the discharge line from the upper portion of the third fluidized bed, the second and/or the third fluidized bed is provided with cooling means and fluidizing gases are withdrawn from a collecting space disposed below the first fluidized bed and above the second and third fluidized beds.

The process can be carried out under pressures in the range from 1 to 50 bars.

The control means may be of various types, e.g. of a pneumatic or mechanical type. It will be particularly desirable so to design the control means that at least one controllable gas stream is caused to act on the transitional region between the lower ends of the second and third fluidized beds. This will provide a fluid-dynamic control valve, which has no moving parts and which ensures the flow of solids at the desired rate through the second fluidized bed.

If the solids are accelerated as they are forwarded, the second fluidized bed will be able to take up all solids which come from the first fluidized bed and to deliver them to the third fluidized bed.

On the other hand, if the forwarding from the second fluidized bed to the third is throttled, the solids will accumulates in the second fluidized bed so that additional solids which come from the first fluidized bed will by-pass the second and third fluidized beds and flow directly to the discharge line and will leave the gas-collecting space without having been cooled.

The desired temperature of the solids which are recycled to the fluidized bed reactor can be adjusted by a control of the rates of uncooled and cooled solids.

It is also important for the process that the solids continuously flow down in the second fluidized bed and that they continuously rise in the third fluidized bed. As a result the cooling fluid by which the heat is dissipated by an indirect heat exchange can flow in each fluidized bed concurrently with or countercurrently to the solids.

The cooling apparatus in accordance with the invention has a first fluidized bed disposed below and communicating with the separator. The first fluidized bed is provided with a solids outlet, which is directed toward a second fluidized bed, which is disposed below the first fluidized bed, a third fluidized bed is disposed beside the second fluidized bed, the second and/or third fluidized bed is provided with cooling means, the second fluidized bed communicates with the third fluidized bed through a solids transfer passage provided in the lower region, a gas-collecting spaced is provided under the first fluidized bad and above the second and third fluidized beds and communicates with the solids discharge line and with a gas discharge line, and control means are provided, which pass solids coming from the first fluidized bed selectively to the second fluidized bed or to the discharge line.

The cooling apparatus may desirably be narrow and may occupy a small floor space. For this reason it can be operated not only under atmospheric pressure but also under a higher pressure up to about 50 bars because it can well be incorporated in a pressure housing. The gas-collecting space is provided with a solids discharge line and with a gas discharge line. A common discharge line may desirably be provided for the solids and the gas.

More specifically, the method of the invention can comprise the steps of:

(a) feeding hot solids from the hot fluidized bed to a first cooling fluidized bed and fluidizing and partially cooling the hot solids therein;

(b) controlledly passing partially cooled solids from the first cooling fluidized bed downwardly to a second cooling fluidized bed spaced below the first cooling fluidized bed and fluidizing and further cooling the partially cooled solids in the second cooling fluidized bed;

(c) at a lower end of the second cooling fluidized bed transferring further cooled solids from the second cooling fluidized bed into a lower end of a third cooling fluidized bed across a transition region;

(d) then cooling and fluidizing the further cooled solids in the third cooling fluidized bed, whereby cooled solids rise in the third cooling fluidized bed;

(e) abstracting heat from fluidized solids by heat exchange therewith in at least one of the second and third cooling fluidized beds;

(f) discharging at least part of the cooled solids rising in the third cooling fluidized bed at an upper portion thereof; and (g) discharging fluidizing gases from the cooling fluidized beds through a collecting space below the first cooling fluidized bed and above the second and third cooling fluidized beds.

In apparatus terms, the cooling apparatus can comprise:

a first cooling fluidized bed;

means connected with the first cooling fluidized bed for feeding hot solids from the hot fluidized bed to the first cooling fluidized bed and fluidizing and partially cooling the hot solids therein;

a second cooling fluidized bed spaced below the first cooling fluidized bed;

means for controlledly passing partially cooled solids from the first cooling fluidized bed downwardly to the second cooling fluidized bed and fluidizing and further cooling the partially cooled solids in the second cooling fluidized bed;

a third cooling fluidized bed spaced below the first cooling fluidized bed and connected at a bottom of the third cooling fluidized bed with a bottom of the second cooling fluidized bed by a transition region communicating between the second and third cooling fluidized beds for transferring further cooled solids from the second cooling fluidized bed into a lower end of a third cooling fluidized bed across the transition region;

means for cooling and fluidizing the further cooled solids in the third cooling fluidized bed, whereby cooled solids rise in the third cooling fluidized bed;

heat exchange means in at least one of the second and third fluidized beds for abstracting heat from fluidized solids by heat exchange therewith in at least one of the second and third cooling fluidized beds;

means for discharging at least part of the cooled solids rising in the third cooling fluidized bed at an upper portion thereof; and means for discharging fluidizing gases from the cooling fluidized beds through a collecting space below the first cooling fluidized bed and above the second an third cooling fluidized beds.

An apparatus in which the hot fluidized bed and the cooling system can be integrated in a system for treating granular solids can comprise:

an expanded hot fluidized bed provided with:

means for introducing granular solids into the hot fluidized bed, means for introducing a fluidizing gas into the expanded hot fluidized bed for treatment of the granular solids therein, and a duct at an upper portion of the hot fluidized bed for discharging a flow of gas entraining solids from the hot fluidized bed;

a separator connected with the duct for receiving gas entraining solids from the hot fluidized bed and separating hot solids to be cooled from gas;

a cooler for cooling the hot solids and comprising:

a first cooling fluidized bed, means connected with the first cooling fluidized bed and the separator for feeding the hot solids to the first cooling fluidized bed and fluidizing and partially cooling the hot solids therein, a second cooling fluidized bed spaced below the first cooling fluidized bed, means for controlledly passing partially cooled solids from the first cooling fluidized bed downwardly to the second cooling fluidized bed and fluidizing and further cooling the partially cooled solids in the second cooling fluidized bed, a third cooling fluidized bed spaced below the first cooling fluidized bed and connected at a bottom of the third cooling fluidized bed with a bottom of the second cooling fluidized bed by a transition region communicating between the second and third cooling fluidized beds for transferring further cooled solids from the second cooling fluidized bed into a lower end of a third cooling fluidized bed across the transition region, means for cooling and fluidizing the further cooled solids in the third cooling fluidized bed, whereby cooled solids rise in the third cooling fluidized bed, heat exchange means in at least one of the second and third fluidized beds for abstracting heat from fluidized solids by heat exchange therewith in at least one of the second and third cooling fluidized beds, means for discharging at least part of the cooled solids rising in the third cooling fluidized bed at an upper portion thereof, and means for discharging fluidizing gases from the cooling fluidized beds through a collecting space below the first cooling fluidized bed and above the second and third cooling fluidized beds; and means for passing at least some cooled solids from the cooler to the hot fluidized bed.

BRIEF DESCRIPTION OF THE DRAWINGS

The above and other objects, features and advantages of our invention will become more readily apparent from the following description, reference being made to the accompanying highly diagrammatic drawing in which:

FIG. 1 is a schematic view showing the cooling apparatus arranged between a separator and a fluidized bed reactor;

FIG. 2 is a longitudinal sectional view showing the separator and the cooling apparatus.

SPECIFIC DESCRIPTION

Figure 3:
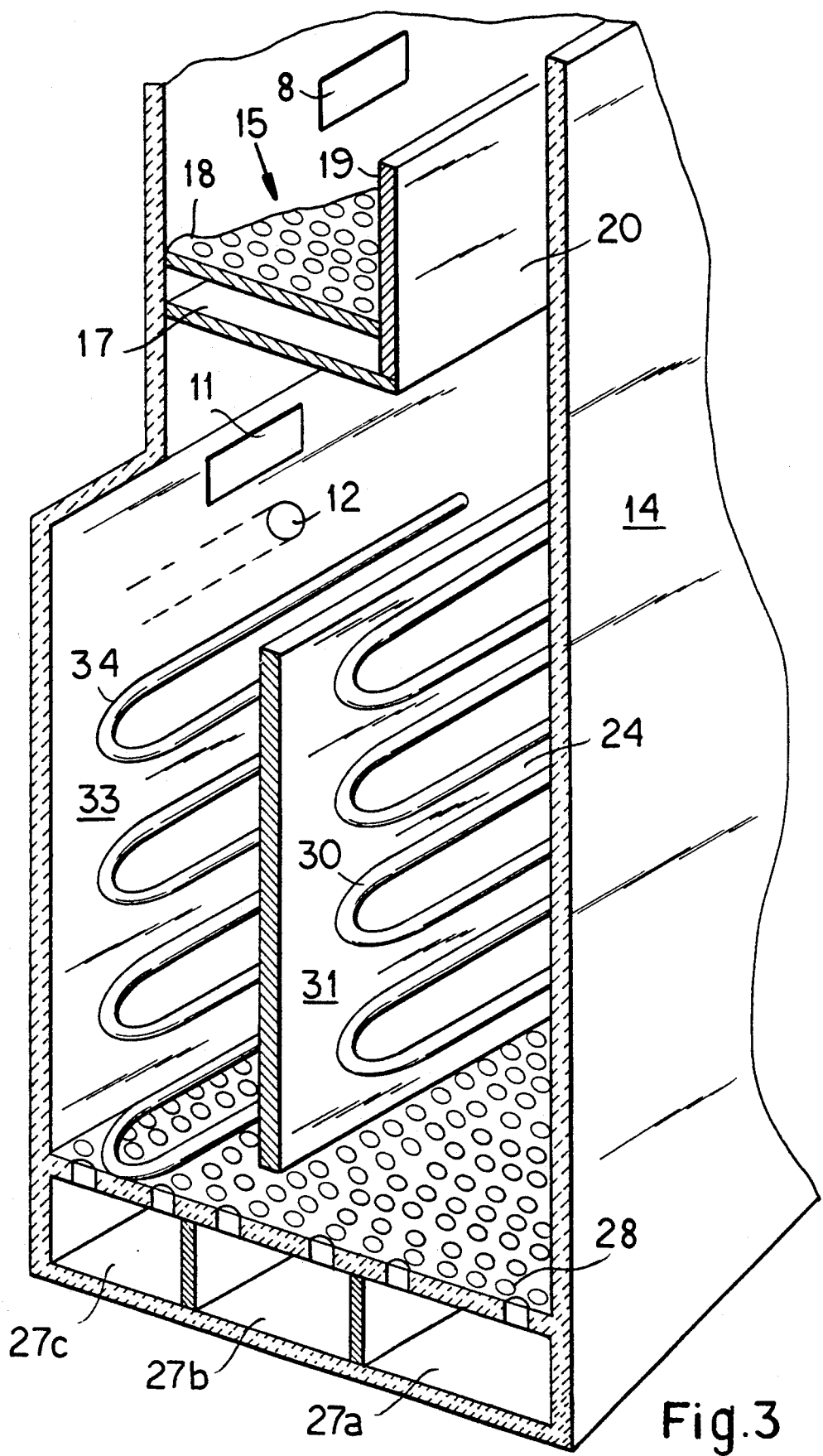
FIG. 3 is a fragmentary perspective view in section of the cooling vessel.

The fluidized bed reactor 1 shown in FIG. 1 serves for a thermal treatment of granular solids, which are supplied through line 2. Fluidizing gas, such as air, comes from line 3. The thermal treatment may consist, e.g. of a combustion or gasification of coal, brown coal or waste materials, and reactors of that kind may also be used, e.g. to roast sulfide ores.

The treatment is effected in a circulating fluidized bed in that gases and solids are transported to a duct 4, from which they enter a separator 5, such as a cyclone. Gases from which substantially all solids have been removed are exhausted in line 6, and the hot solids which have been freed of solids and may be at temperatures in the range from about 400° to 1200° C. flow through a tubular chute 8 to a cooling apparatus 9. In the tubular chute the solids form a gas-tight sealing.

The cooling apparatus, which is represented only in a simplified form in FIG. 1, is supplied with fluidizing gas through line 10 and more or less cooled solids are withdrawn in the discharge line 11 and are recycled to the fluidized bed reactor 1. Surplus solids are removed through line 12. During an operation under superatmospheric pressure, the reactor 1 is surrounded by a pressure housing 1a, which is indicated by dash lines, and the separator 5 and the cooling apparatus 9 are contained in a separate pressure-resistant housing 40, see also FIG. 2.

In FIG. 2, the fluidized bed reactor 1 with the lines 2 and 3 have been omitted for the sake of simplicity. FIG. 2 shows a duct 4 for conducting a gas-solids mixture to the separator 5 and also shows the exhaust gas line 6 and the tubular chute 8 through which the hot solids enter a first fluidized bed 15. Care is taken to form in the tubular chute 8 a gas-tight seal consisting of a descending compact bed of solids. Fluidizing gas, such as air, is supplied at a controllable rate to the first fluidizing bed 15 through line 16, a distributing chamber 17 and the grate 18 provided with orifices. Solids and fluidizing gas pass over the wall 19 into the outlet 20 and first enter a gas-collecting space 22. The gases are discharged through line 11 and are then fed to the fluidized bed reactor 1, see FIG. 1.

The solids falling down from the outlet 20 enter a second fluidized bed 24, which is flown through by rising fluidizing gases. The fluidizing gases are supplied at a controllable rate through a line 26, a distributing chamber 27a and a grate 28 provided with orifices The second fluidized bed 24 contains a cooling means 30, which are flown through by a cooling fluid, such as water or steam. In the second fluidized bed the hot solids are gradually cooled as they descend to a solids transfer passage 32, which is provided between the partition 31 and the grate 28.

From the passage 32 the solids then rise through a third fluidized bed 33, which is also provided with cooling means 34. The three fluidized beds 15, 24, and 33 and the gas-collecting space 22 are surrounded by a substantially closed housing 14, which is contained in the pressure housing 14, which is contained in the pressure housing 40.

Fluidizing gas for the third fluidizing bed 33 is supplied through the line 25 and the distributing chamber 27c. By means which are not shown and are known per se the rate of that fluidizing gas can also independently be controlled. In the embodiment shown in FIG. 2 a further distributing chamber 27b is disposed between the distributing chambers 27a and 27c and is supplied through line 29 with fluidizing gas at an independently controlled rate. The gas from the distributing chamber 27b is essential for the forwarding of the solids from the second fluidized bed 24 through the passage 32 to the third fluidizing bed 33.

The solids which are cooled as they rise in the third fluidized bed 33 finally enter a discharge line 11 and together with the gases coming from the collecting space 22 are recycled to the fluidized bed reactor 1. The upper portion of the fluidized bed 33 is suitably provided with a second discharage line 12, so that cooled solids can be removed under the control of a flow control valve 36 from the circulating solids and may be supplied for a different use or to a dump. Such solids leave the cooling apparatus only at the end of the cooling path so that they will have transferred a major part of their sensible heat to the cooling fluid used in the cooling means 34.

Because the flow rate of gas in line 29 can be controlled, a fluid-dynamical valve has been provided, which operates as follows: In case of a decrease of the gas supply rate the solids will accumulate in the second fluidized bed 24 and entirely or substantially uncooled solids will finally flow from the outlet 20 over the partition 31 and the third fluidized 33 into the discharge line 11. By an accumulation of more or less solids in the second fluidized bed 24, a larger or smaller part of the solids can be caused to by-pass the fluidized beds 24 and 33 without being cooled. This will change the temperature of the mixed solids in the discharge line 11, where the uncooled solids and the cooled solids coming from the fluidized 33 are combined. It is apparent that the temperature of the solids in the discharge line 11 can be controlled by a control of the rate at which gas is supplied in line 29.

EP-A-0 407 730 discloses a fluidized bed reactor and an associated fluidized bed cooler of a fluidizing circulating fluidized bed system, in which the reactor and the cooler are accommodated in separate pressure housing. Such pressure housings can readily be used also in the plant in accordance with the invention. In that case it will be particularly desirable that the apparatus is narrow and that the separator 5, the first fluidized bed 15 and the second fluidized bed 15, the second fluidized bed 24, and the third fluidized bed are substantially vertical so that they require only small floor space. Such an arrangement can be enclosed in a very simple manner in a pressure housing 40, as shown in FIG. 2. That advantage will also be afforded if the arrangement of the three fluidized beds 15, 24 and 33 is somewhat modified. The first fluidized bed 15 may also be provided with heat exchanger cooling means, e.g. water-cooled pipe coils or passes like the cooling means 30, 34 which are not shown in the drawing.

We claim:

1. A method of cooling solids from a fluidized bed reactor, comprising the steps of:
   (a) providing a hot fluidized bed reactor and a housing in communication therewith having first, second and third fluidized beds therein, and feeding solids from said fluidized bed reactor to said first fluidized bed and fluidizing said solids therein;
   (b) controlledly passing solids from said first fluidized bed over the top of a wall downwardly through a gas collecting space below the first fluidized bed to said second cooling fluidized bed, said second bed being spaced below said first fluidized bed and fluidizing and cooling said solids in said second cooling fluidized bed;
   (c) at a lower end of said second cooling fluidized bed transferring cooled solids from said second cooling fluidized bed below said space into a lower end of said third cooling fluidized bed across a transition region beneath a wall separating said second and third fluidized beds;
   (d) then cooling and fluidizing said cooled solids in said third cooling fluidized bed, whereby cooled solids rise in said third cooling fluidized bed;
   (e) abstracting heat from fluidized solids by indirect heat exchange therewith in said second and third cooling fluidized beds;
   (f) discharging at least part of the cooled solids rising in said third cooling fluidized bed at an upper portion thereof;
   (g) withdrawing fluidizing gases from said cooling fluidized beds through a collecting space below said first cooling fluidized bed and above said second and third cooling fluidized beds; and (h) passing a fluidizing gas through the solids transferred through said transition region.

2. The method defined in claim 1, further comprising the step of:

controlling flow of fluidizing gas to said first cooling fluidized bed independently of control of flow of fluidizing gas to said second and third cooling fluidized beds.

3. The method defined in claim 1, further comprising the step of:

maintaining all of said first, second and third cooling fluidized beds under a common pressure of 1 to 50 bar.

4. An apparatus for cooling solids from a fluidized bed reactor, comprising:

means forming an upright housing, a first fluidized bed at an upper location of said housing and having a first wall delimiting said first fluidized bed;

means connected with said first fluidized bed for feeding solids from a fluidized bed reactor to, and over said first fluidized bed, and means for fluidizing said solids therein;

means, including a second wall, forming a second cooling fluidized bed in said housing, spaced below said first cooling fluidized bed, and positioned to receive solids from said first fluidized bed passing over said wall;

said second wall for forming a transition region below said second cooling fluidized bed and for forming a gas-collecting space above said second cooling fluidized bed and below said first fluidized bed;

means, including said second wall, forming a third cooling fluidized bed in said housing spaced below said first fluidized bed and connected at a bottom of said third cooling fluidized bed with a bottom of said second cooling fluidized bed by said transition region, said transition region communicating said second and third cooling fluidized beds below said second wall, and said second wall separating said second and third fluidized beds for transferring further cooled solids from said second cooling fluidized bed into a lower end of a third cooling fluidized bed across said transition region;

means for fluidizing said second fluidized bed;

means for fluidizing said cooled solids in said third cooling fluidized bed, whereby cooled solids rise in said third cooling fluidized bed;

heat exchange coils in said second and third fluidized beds for abstracting heat from fluidized solids by indirect heat exchange therewith;

means for discharging from said housing at least part of the cooled solids rising in said third cooling fluidized bed at an upper portion thereof;

means for discharging from said housing fluidizing gases from said second and third cooling fluidized beds through said gas-collecting space below said first cooling fluidized bed and above said second and third cooling fluidized beds; and means for passing a fluidized gas upwardly through solids transferred through said transition region from said second cooling fluidized bed to said third cooling fluidized bed.

5. The apparatus as defined in claim 4 wherein said means for discharging at least part of the cooled solids is a discharge duct independent from and in addition to a discharge duct forming said means for discharging fluidizing gases.

6. An apparatus for cooling solids from a fluidized bed reactor, comprising:

means forming an upright housing, a first fluidized bed at an upper location of said housing and having a first wall delimiting said first fluidized bed;

means connected with said first fluidized bed for feeding solids from a fluidized bed reactor to, and over said first fluidized bed, and means for fluidizing said solids therein;

means, including a second wall, forming a second cooling fluidized bed in said housing, spaced below said first cooling fluidized bed, and positioned to receive solids from said first fluidized bed passing over said wall;

said second wall for forming a transition region below said second cooling fluidized bed and for forming a gas-collecting space above said second cooling fluidized bed and below said first fluidized bed;

means, including said second wall, forming a third cooling fluidized bed in said housing spaced below said first fluidized bed and connected at a bottom of said third cooling fluidized bed with a bottom of said second cooling fluidized bed by said transition region, said transition region communicating said second and third cooling fluidized beds below said second wall, and said second wall separating said second and third fluidized beds for transferring further cooled solids from said second cooling fluidized bed into a lower end of a third cooling fluidized bed across said transition region;

means for fluidizing said second fluidized bed;

means for fluidizing said cooled solids in said third cooling fluidized bed, whereby cooled solids rise in said third cooling fluidized bed;

heat exchange coils in said second and third fluidized beds for abstracting heat from fluidized solids by indirect heat exchange therewith;

means for discharging from said housing at least part of the cooled solids rising in said third cooling fluidized bed at an upper portion thereof, and for discharging from said housing fluidizing gases from said second and third cooling fluidized beds through said gas-collecting space below said first cooling fluidized bed and above said second an third cooling fluidized beds; and means for passing a fluidizing gas upwardly through solids transferred through said transition region from said second cooling fluidized bed to said third cooling fluidized bed.

7. A process for thermally treating granular solids, comprising the steps of:

(a) providing a fluidized bed reactor in fluid communication with a separator and a cooling apparatus;

(b) feeding a fluidizing gas to said fluidized-bed reactor containing granular solids and heating said gas and solids to form a hot gas and heated granular solids at a temperature of 400° C. to and withdrawing from an upper portion of said fluidized-bed reactor said hot gas and said heated granular solids;

(c) separating said hot gas and said heated granular solids from one another in a separator;

(d) feeding said heated granular solids from said separator to an upper location of said cooling apparatus, said cooling apparatus having a housing;

said housing comprising:

($d_1$) a first fluidized bed at an upper region of said housing receiving said heated granular solids from said separator at said upper location, ($d_2$) a gas-collecting space in said housing below said first fluidized bed, ($d_3$) a second fluidized bed in said housing below said space, ($d_4$) a third fluidized bed adjacent said second fluidized bed in said housing below said space, ($d_5$) a transition region connecting bottoms of said second and third fluidized beds, ($d_6$) means in said second fluidized bed for indirectly cooling said second fluidized bed, and ($d_7$) means in said third fluidized bed for indirectly cooling said third fluidized bed;

(e) passing solids from said first fluidized bed through said space onto an upper region of said second fluidized bed;

(f) moving at least part of the solids in said second fluidized bed downwardly to said transition region while cooling the solids in the second fluidized bed;

(g) moving solids from said second fluidized bed through said transition region into the bottom of said third fluidized bed;

(h) moving solids upwardly from the bottom of said third fluidized bed while cooling the solids in said third fluidized bed, to an upper region of said third fluidized bed;

(i) fluidizing each of said first, second and third fluidized beds by feeding fluidizing gas from below into said first, said second and said third fluidized beds and into said transition region;

(j) withdrawing cooled solids from said upper region of said third fluidized bed and feeding withdrawn cooled solids at least in part to said fluidized-bed reactor; and (k) withdrawing gas from said gas-collecting space.

8. The process defined in claim 7, further comprising the step of maintaining said housing and the fluidized beds therein under a common pressure of 1 to 50 bar.

9. The process defined in claim 7, further comprising the step of controlling flow of fluidizing gas to said first fluidized bed independently of flow of fluidizing gas to said second and third fluidizing beds.

* * * * *